United States Patent
Kadoya et al.

[11] Patent Number: 5,944,922
[45] Date of Patent: Aug. 31, 1999

[54] HIGHLY TENACIOUS FERRITIC HEAT RESISTING STEEL

[75] Inventors: Yoshikuni Kadoya; Hisataka Kawai; Koji Takahashi; Ryotarou Magoshi, all of Takasago, Japan

[73] Assignee: Mitsubishi Heavy Industries, Ltd., Tokyo, Japan

[21] Appl. No.: 09/040,826

[22] Filed: Mar. 18, 1998

[30] Foreign Application Priority Data

Mar. 18, 1997 [JP] Japan ..................... 9-064318

[51] Int. Cl.$^6$ .................. C22C 38/44; C22C 38/46
[52] U.S. Cl. .......................... 148/325; 148/326
[58] Field of Search ................ 148/325, 326; 420/38

[56] References Cited

U.S. PATENT DOCUMENTS 5,779,821  7/1998  Ishii et al. ................ 148/325

FOREIGN PATENT DOCUMENTS

| 0828010 | 3/1998 | European Pat. Off. . |
| 61-133365 | 6/1986 | Japan ........................ 420/38 |
| 63-171856 | 7/1988 | Japan . |
| 04371551 | 12/1992 | Japan . |
| 06293940 | 10/1994 | Japan . |
| 08225833 | 9/1996 | Japan . |
| 09059747 | 3/1997 | Japan . |

OTHER PUBLICATIONS

European Search Report for EP 98 10 4483 completed Jul. 7, 1998 by G. Badcock.

Primary Examiner—Deborah Yee
Attorney, Agent, or Firm—Alston & Bird LLP

[57] ABSTRACT

The present invention discloses ferritic heat resisting steels for manufacturing a rotor or a disk of a gas turbine, which have high creep rupture strength at high temperatures and excellent tenacity at room ordinary temperatures. The highly tenacious ferritic heat resisting steels contain, by weight, carbon of 0.08 to 0.25%, silicon of 0.5% or lower, manganese of 1.0% or lower, nickel exceeding 1.0% and lower than 3.0%, chromium of 9.0 to 12.5%, molybdenum exceeding 0.3% and lower than 1.5%, tungsten of 1.0 to 3.0%, vanadium of 0.10 to 0.35%, niobium of 0.02 to 0.10%, nitrogen of 0.01 to 0.80%, boron of 0.001 to 0.01% and cobalt of 1.0 to 5.0%, and a remaining part is mostly iron. Its structure is composed of a tempered martensite matrix.

12 Claims, 2 Drawing Sheets

HIGHLY TENACIOUS FERRITIC HEAT RESISTING STEEL

BACKGROUND OF THE INVENTION

1. Field of the Invention

The present invention relates to heat resisting steels used for such large forged products as a rotor or a disk of a steam or gas turbines. More particularly, the invention relates to forging heat resisting steels for forming a gas turbine rotor or a disk having a creep rupture strength within a high temperature range of 400 to 600° C. and excellent tenacity at room temperature.

2. Description of the Related Art

In recent years, we have seen a tremendous increase in attention paid to a gas turbine as an efficient and clean power generation system including a combined cycle power generation plant composed by combing a gas turbine and a steam turbine. For further improvement in the efficiency of such a gas turbine or a combined cycle power generation plant, the gas temperature at the entrance of the gas turbine has been increased. Currently, 1300° C. class plants have been put to practical use, and 1500° C. class plants are under development.

With such increase in the gas temperature of the entrance, better high-temperature strength and tenacity have also been demanded for moving and stationary blades, a combustor, a gas turbine, a compressor disk, and so on. As a material for a disk which is largest among rotary parts of the gas turbine, an Ni base alloy such as Inconel has started to be used with higher temperatures. However, out of consideration for the difficulty of manufacturing large parts made of heat resisting materials and increases in costs associated with increasing output requirements, stronger demand for improved performance of ferritic materials such as 12% Cr steels or low alloy steels have currently been made.

As materials for the turbine disk of a gas turbine or a jet engine, alloy steel forged products each having chemical composition shown in Tables 1 to 4 have conventionally been used. Table 1 shows composition examples of 3.5Ni—Cr—Mo—V steel (low alloy steel disk material). Table 2 shows composition examples of Cr—Mo—V steel (low alloy steel disk material). Table 3 shows composition examples of 12% Cr steel disk material. Table 4 shows composition examples of a Fe base heat resisting alloy disk material.

TABLE 1

COMPOSITION EXAMPLE OF LOW ALLOY STEEL DISK MATERIAL
(3.5Ni—Cr—Mo—V STEEL)

| STAN-DARD | COMPOSITION (WT. %) | | | | | | | |
|---|---|---|---|---|---|---|---|---|
| | C | Mn | P | S | Si | Ni | Cr | Mo | V |
| ASTM.A471 Class 1–9 | (NOTE) | MAX. 0.70 | MAX. 0.015 | MAX. 0.015 | 0.15–0.35 | 2.00–4.00 | 0.75–2.00 | 0.20–0.70 | MINI. 0.05 |

(NOTE):
CLASS 4 AND 5; UP TO 0.35%,
CLASS 6,7,8 AND 9; UP TO 0.40%,
OTHER CLASS; UP TO 0.28%

A 3.5Ni—Cr—Mo—V steel (low-alloy steel) disk material containing several percent of Ni like that shown in Table 1 has a relatively high 0.2% yield strength (0.2% yield strength is simply referred to as yield strength, hereinafter) which is 70 to 120 kg/mm$^2$ and high tenacity in which V-notch Charpy impact absorbing energy is 5 to 10 kg-m or higher at 25° C. In addition, dissolving, forging and heat treatment are relatively easy, costs are low and the material is easily available. However, if use temperature (metal temperature of a disk material) exceeds 300 to 350° C., this disk material enters a creep region and, for material strength designing, creep must be taken into consideration. Consequently, designing becomes complex and a strength such as tensile strength or yield strength shows a softening phenomenon in which strength is reduced more as the use time becomes longer. Further, if this disk material is used for several hundreds to several tens of thousands of hours within the temperature range of 350 to 500° C., its tenacity is substantially reduced because of temper brittleness. Such a disadvantage is inherent in low-alloy steels containing Ni of several percent or more, which is used for a disk material having improved strength and tenacity by performing quenching and tempering for thermal refining.

TABLE 2

COMPOSITION EXAMPLE OF LOW ALLOY STEEL DISK MATERIAL
(Cr—Mo—V STEEL)

| STAN-DARD | COMPOSITION (WT. %) | | | | | | | |
|---|---|---|---|---|---|---|---|---|
| | C | Mn | P | S | Si | Ni | Cr | Mo | V |
| ASTM.A471 Class 10 | 0.27–0.37 | 0.70–1.00 | MAX. 0.015 | MAX. 0.015 | MINI. 0.20 | MAX. 0.50 | 0.85–1.25 | 1.00–1.50 | 0.20–0.30 |

For Cr—Mo—V steels (low-alloy steels) shown in Table 2, costs are low and a material made of these steels is easily available as in the case of 3.5Ni—Cr—Mo—V steels described above with reference to Table 1. Different from 3.5Ni—Cr—Mo—V steels, however, these steels do not show any substantial softening phenomenon or temper brittleness. Since the Cr—Mo—V steels do not enter a creep region until use temperature reaches 430 to 480° C., the use temperature can be increased by 100 to 200° C. more than that for 3.5Ni—Cr—Mo—V steels. However, tenacity is not so high as that for 3.5Ni—Cr—Mo—V steels. Especially, if tensile strength or yield strength is to be increased, tenacity will be substantially reduced. For example, if temper refining is performed so as to set yield strength to a high level of 70 to 80 kg/mm$^2$ or more, V-notch Charpy impact energy will be greatly reduced to 1 to 2 kg-m or lower at a temperature of 25° C. Further, the material made of these steels enters a creep region even at a temperature of about 400° C. and, in this temperature region, notch weakening occurs (a notch creep rupture strength becomes weaker than a smooth creep rupture strength). Consequently, if Cr—Mo—V steels are used for a disk material, temper refining (quenching or tempering) for greatly increasing the strength cannot be performed and, typically, a strength level is set lower than that for 3.5Ni—Cr—Mo—V steels. Usually, yield strength at room temperature is 60 to 70 kg/mm$^2$ or lower.

TABLE 3

COMPOSITION EXAMPLE OF 12% Cr STEEL DISK MATERIAL

| PRODUCT NAME | COMPOSITION (WT. %) | | | | | | | |
|---|---|---|---|---|---|---|---|---|
| | C | Si | Mn | Nb | Cr | MO | Ni | W | V |
| Jessop - Saville H46 (NOTE 1) | 0.16 | 0.3 | 0.7 | 0.25 | 11.6 | 0.6 | — | — | 0.30 |
| Jethete M152 (NOTE 2) | 0.10 | 0.3 | 0.7 | — | 12.0 | 1.8 | 2.4 | 0.35 | — |
| Firth - Vickers 448 (NOTE 3) | 0.13 | 0.5 | 1.0 | 0.8 | 11.2 | 0.6 | — | — | 0.30 |

(NOTE 1): PRODUCT BY U.S Jessop-Saville Ltd.
(NOTE 2): PRODUCT BY U.S Samuel Fox & Co. Ltd.
(NOTE 3): PRODUCT BY U.S Firth-Vickers Stainless Steel Ltd.

For 12% Cr steels shown in Table 3, high strength and high tenacity are secured by making an alloy contain, in addition to Cr of about 12%, Ni, Mo and V. These 12% Cr steels have higher corrosion resistance and higher oxidation resistance compared with the foregoing 3.5Ni—Cr—Mo—V steels and the Cr—Mo—V steels both as low alloy steels. Strength at high temperatures and tenacity at room temperature are relatively better compared with the above-mentioned Cr—Mo—V steels. However, any great increase in strength or tenacity cannot be expected.

TABLE 4

COMPOSITION EXAMPLE OF Fe BASE HEAT RESISTING ALLOY DISK MATERIAL

| STANDARD | COMPOSITION (WT. %) | | | | | | | | | | | | |
|---|---|---|---|---|---|---|---|---|---|---|---|---|---|
| | C | Mn | Si | P | S | Cr | Ni | MO | Ti | Cu | Al | V | B |
| ASTM A638 | | | | | | | | | | | | | |
| Grade 662 | MAX 0.08 | MAX 1.50 | MAX 1.0 | MAX 0.040 | MAX 0.030 | 12.00–15.00 | 21.00–28.00 | 2.50–3.50 | 1.55–2.00 | MAX 0.50 | MAX 0.35 | — | 0.0010–0.010 |
| Grade 660 | MAX 0.08 | MAX 2.00 | MAX 1.00 | MAX 0.040 | MAX 0.030 | 13.50–16.00 | 24.00–27.00 | 1.00–1.50 | 1.90–2.35 | — | MAX 0.35 | 0.10–0.50 | 0.0010–0.010 |

A Fe base heat resisting alloy like that shown in Table 4 contains large quantities of Ni and Cr. Accordingly, since a material made of this alloy has high corrosion resistance and high oxidation resistance and enters a creep region in a temperature of 500 to 580° C. or higher, high temperature strength and uniform austenitic structure can be provided. No brittle fracture occurs and thus brittleness needs not be taken into consideration. In addition, since its strength is provided by precipitation hardening of a γ' phase [Ni$_3$(Al•Ti)] intermetallic compound during solution heat treatment or aging treatment, different from the case of the foregoing low-alloy steels (tempered bainite structure) or 12% Cr steels (tempered martensite structure), a mass effect needs not be taken into consideration during temper refining. However, as this alloy contains large quantities of expensive alloy elements such as Ni, Cr or Mo and highly active alloy elements such as Al or Ti, a normal dissolving method cannot be employed. A higher level dissolving technique such as vacuum high frequency dissolving or vacuum arc melting is necessary. Consequently, costs are very high, which may be 5 to 10 times as high as those for the usual low-alloy steels. Furthermore, because of the recent attainment of large capacity for a turbine, the unit weight of a necessary disk is 6 to 8 tons or more. For manufacturing such large Fe-base heat resisting disk forged products, special facilities must be installed. At present, in Japan as well as abroad, the number of makers having such facilities is quite limited, amounting only to a few companies.

On the other hand, in recent years, efforts have been made to attain high efficiency and large capacity for a gas turbine. The entrance gas temperature for the gas turbine has to be raised for achieving improved thermal efficiency. Accordingly, a disk metal temperature is increased to 450° C. or higher. It is difficult to limit this temperature increase to 300 to 350° C. which is a highest use temperature range for the foregoing 3.5Ni—Cr—Mo—V steels. For the attainment of large capacity, the disk size is also increased. Thus, the unit weight of a disk forged product is very heavy, reaching 6 to 8 tons or higher.

In addition, for high temperature parts of the gas turbine such as a rotor or a disk, excellent material characteristics including high temperature strength and high tenacity must be provided. It is also necessary to limit changes in the material characteristics to a minimum at high use temperatures in a plant over long periods of time. Among the rotor or disk materials thus far used, especially 12% Cr heat resisting steels have been found to have good material characteristics including high-temperature strength and high tenacity. However, brittleness occurs following the long-time use of the conventional 12% Cr heat resisting steels. Thus, in order to deal with the gas temperature increase at the entrance, such brittleness must be suppressed. The brittleness of 12% Cr heat resisting steels is composed of reversible brittleness and non-reversible brittleness. The reversible brittleness can be overcome by rapidly cooling the material after heating the same close to a tempering temperature. The non-reversible brittleness cannot be overcome by such re-heating and rapid cooling. In the case of the former reversible brittleness, the contribution of temper brittleness caused by intergranular segregation of impurity elements may be large. For reducing this brittleness, the reduction of impurity elements or the reduction of Si or Mn is known to be effective. For low-alloy steels having large brittleness sensitivity such as 3.5Ni—Cr—Mo—V steels, the attainment of high purity is known to be very effective for reducing such brittleness sensitivity.

SUMMARY OF THE INVENTION

The present invention was made in order to solve the problems discussed above. It is a first object of the invention to provide low-alloy steels for a disk, which can be manufactured and available as easily as the conventional low-alloy steels such as the foregoing 3.5Ni—Cr—Mo—V steels or Cr—Mo—V steels. In this case, the highest use temperature of disk metal can be increased to 400 to 500° C., which is higher by 100 to 200° C. than that of the 3.5Ni—Cr—Mo—V steels. The strength level is equal to that of the 3.5Ni—Cr—Mo—V steels. In addition, if the disk metal temperature can be increased to 400 to 480° C., thermal efficiency can be greatly improved. If 12% Cr steels are used, even large forged products of 6 to 8 tons or heavier can be easily obtained in Japan. Accordingly, costs can be reduced, which has been the challenge in recent years.

It is a second object of the present invention to provide a disk material which has not only high strength at high temperatures but also high tenacity at room temperature. High tenacity must be provided, because in the rotor or the disk of a gas turbine, brittle fracture may occur if the tenacity of the turbine at normal temperature is low.

It is a third object of the present invention to provide a disk or a rotor having high tenacity for preventing the occurrence of cracks caused by thermal fatigue. If stops and starts are often repeated according to operational requirements of a gas turbine, especially when the operation is halted, only a disk surface is rapidly cooled and thermal stress is created. Consequently, cracks by thermal fatigue may occur. In order to prevent the occurrence of such cracks caused by thermal fatigue, the disk material must have high tenacity.

It is a fourth object of the present invention to provide a disk material which has various good properties, not only in the outer peripheral part of a disk but also in its center part, such as long-time creep rupture strength and high tenacity at ordinary temperature in particular. For a large capacity gas turbine, the weight of a steel ingot for a rotor or a disk reaches several tens of tons. Thus, a cooling speed of the disk center part is only about 100° C./hr even if it is rapidly cooled by oil or the like after solid-solution treatment. If quenching is performed at such a slow cooling speed, pro-eutectoid ferrite precipitation may occur during quenching. Consequently, a specified strength and tenacity may not be provided. The invention provides steels having high long-time creep rupture strength and excellent tenacity in the center part of a large disk by carrying out, as described later, a test simulating the cooling conditions of the disk center.

It is a fifth object of the present invention to provide a disk material which has a tempering temperature sufficiently higher than a use temperature so as to prevent the substantial reduction of strength even if the material is used over long periods of time at high temperatures.

It is a sixth object of the present invention to provide a disk material which dose not form eutectic NbC at the time of solidification of a forged product weighing ten-odd tons from its melted state during manufacturing steel ingots, which also dose not form eutectic $Fe_2B$ or BN at a forging stage in which the product is heated to 900 to 1200° C., and which further dose not form δ-ferrite during a heat treatment stage even if quenching is performed at 1050 to 1150° C. If produced, eutectic NbC is harmful to a mechanical property. Eutectic $Fe_2B$ causes cracks, which makes it impossible to perform forging. BN reduces the mechanical property. The formation of δ-ferrite substantially reduces fatigue strength during high-temperature use. It can thus be understood that any eutectic NbC, eutectic $Fe_2B$, BN or δ-ferrite should not be produced.

We reviewed the conventional 12% Cr steels and studied an optimal adding quantity of each element in order to further increase strength. As a result, we made the following new findings. A martensite structure is made stable and tenacity is improved by increasing the adding quantity of Ni. In addition to the stable structure, temper softening resistance is increased by actively adding a relatively larger quantity of Co compared with that for the conventional heat resisting steels. Strength at high temperatures is increased by simultaneously adding Mo and W. Specifically, the adding quantity of W is increased more than Mo, a larger amount of Mo equivalent (Mo+0.5W) is added compared to conventionally used and, accordingly, high-temperature strength can be further increased by the synergistic effect of the Mo equivalent amount and Co. The present invention is based on such findings.

More particularly, according to a first aspect of the present invention, highly tenacious ferritic heat resisting steels contain, by weight %, carbon of 0.08 to 0.25%, silicon of 0.5% or less, manganese of 1.0% or less, nickel of more than 1.0% and 3.0% or less, chromium of 9.0 to 12.5%, molybdenum of 0.3% or more and less than 1.5%, tungsten of 1.0 to 3.0%, vanadium of 0.10 to 0.35%, niobium of 0.02 to 0.10%, nitrogen of 0.01 to 0.08%, boron of 0.001 to 0.01% and cobalt of 1.0 to 5.0%, and the remaining is substantially iron. The structure is composed of martensite matrix.

According to a second aspect of the present invention, highly tenacious ferritic heat resisting steels contain, by weight %, carbon of 0.08 to 0.25%, silicon of 0.5% or less, manganese of 1.0% or less, nickel of more than 1.0% and 3.0% or less, chromium of 9.0 to 12.5%, molybdenum of 0.3% or more and less than 1.5%, tungsten of 1.0 to 3.0%, vanadium of 0.10 to 0.35%, niobium of 0.02 to 0.10%, nitrogen of 0.01 to 0.08%, boron of 0.001 to 0.01% and cobalt of 1.0 to 5.0%, and the remaining is substantially iron. The structure is composed of tempered martensite matrix. The Cr equivalence (Cr equivalence=Cr+6Si+4Mo+1.5W+ 11V+5Nb−40C−2Mn−4Ni−2Co−30N) is 2.0% or less. The B equivalence represented by B+0.5N is 0.03% or less. The Nb equivalence represented by Nb+0.4C is 0.12% or less. The Mo equivalence represented by Mo+0.5W is 1.40 to 2.45%. Among inevitable impurity elements, sulfur is limited to 0.01% or less and phosphorous is limited to 0.03% or less.

According to a third aspect of the present invention, in the foregoing highly tenacious ferritic heat resisting steels, a temperature for solution/tempering heat treatment is set to 1050 to 1150° C. First-stage tempering heat treatment is performed at a temperature of at least 500 to 570° C. after quenching. Then, second-stage tempering heat treatment is performed at a higher temperature of 530 to 680° C.

According to a fourth aspect of the present invention, in the foregoing highly tenacious ferritic heat resisting steels, an $M_{23}C_6$ carbide and an intermetallic compound are mainly deposited at grain boundaries and martensite-lath boundaries by the foregoing heat treatment. An MX carbon nitride is deposited within martensite-lath. Total amount of these deposited materials is 1.5 to 4.0 wt. %. An austenite crystal grain diameter after the foregoing quenching heat treatment is 20 to 150 μm. Further, steel ingots for making the heat resisting steels are obtained by using an electroslag remelting method, or a steel ingot manufacturing method similar to it, such as an electroslag feeder heat insulating method.

For manufacturing a large rotor or a large disk, lumpy NbC may be produced (crystallized) at the time of solidification from a melted state in a steel ingot making stage. Since this coarse NbC is harmful to mechanical properties, the production of this NbC must be prevented during steel ingot manufacturing. According to the present invention, NbC is prevented from being produced by defining the sum of niobium plus 0.4 times carbon as Nb equivalence and by controlling this equivalence to Nb+0.4≦0.12%. As another problem, in a forging stage, eutectic crystal $Fe_2B$ or BN may be produced when the material is heated and held at 900 to 1200° C. If produced, eutectic crystal $Fe_2B$ causes cracks, which make it impossible to perform forging. BN degrades a mechanical properties. Thus, the production of eutectic crystal $Fe_2B$ or BN must be prevented during forging. According to the invention, $Fe_2B$ or BN is prevented from being produced by defining the sum of B plus 0.5 times N as B equivalence, and by controlling this equivalence to B+0.5N≦0.030%. As yet another problem, in a heat treatment stage, lumpy δ-ferrite may be produced at the time of performing solution heat treatment at a temperature of 1050 to 1150° C. If produced, lumpy δ-ferrite causes cracks during forging and substantially reduces a fatigue strength. Thus, the production of this δ-ferrite must be prevented during the heat treatment. According to the invention, δ-ferrite is prevented from being produced by limiting the Cr equivalence to 2.0% or less as conventionally proposed. Among inevitable impurity elements, S is limited to 0.01% or less and P is limited to 0.03% or less.

The addition of much Co has conventionally been considered improper, especially for steels containing W in which tenacity is easily reduced. This is because Co reduces the Charpy impact value. However, as described later in the embodiment section, we discovered that the addition of Co of 1.0% or more, preferably about 2.5%, was very effective for increasing a high-temperature strength when Ni of 1 to 3% was added. Accordingly, Co of 1.0% or more is contained, so that sufficient solidification of Mo and W is ensured and structural stability during long-time use are improved.

Compared with the conventional low-alloy steels and 12% Cr steels used for manufacturing a rotor or a disk of a gas turbine, the highly tenacious ferritic heat resisting steels of the present invention have greater tenacity and larger high-temperature strength and sufficiently reduce designing stress. This is because the heat resisting steels of the invention have a martensite structure within the chemical composition ranges described above with reference to the first and second aspects of the invention. In addition, the heat resisting steels of the invention have excellent structural stability for high-temperature and long-time use. In other words, when no Co or B were added in the conventional 12% Cr steels, Co of 1.0 to 5.0% is added and B of 0.001 to 0.01% is added in the heat resisting steels of the present invention. Accordingly, the martensite structure can be made more stable, tempering softening resistance can be increased and quenching capability can be improved. Also, in order to compensate for the reduction of high-temperature strength caused by the addition of Ni of 1.0 to 3.0%, Mo and W are simultaneously added so as to increase the high-temperature strength. Accordingly, since much Co is added, sufficient solid solution is realized for Mo and W and structural stability during long-time use can be provided. A greater quantity of the Mo equivalence (Mo+0.5W) is added for the heat resisting steels of the invention compared with the conventional steels. Accordingly, the highly tenacious ferritic heat resisting steels have a higher room-temperature strength, a better high-temperature strength and greater tenacity. The steels of the invention are more reliable than the conventional steels and suitably used for producing forged steel materials for a rotor or a disk of a large and high-temperature gas turbine. For example, under the use condition of a 1500° C. class gas turbine, the steels of the invention are highly reliable over a long time and effective for improving the efficiency of thermal power generation.

The highly tenacious ferritic heat resisting steels of the present invention may be used as occasion demands, for example, for a large rotor of a steam turbine which requires high tenacity.

DETAILED DESCRIPTION OF THE PREFERRED EMBODIMENTS

In this section, the reasons for the foregoing chemical composition and quantity of each element in the highly tenacious ferritic heat resisting steels of the present invention will be described. In the following description, % indicating a content means wt. %.

Carbon (C)

C is quenched and combined with Cr, Mo or W during tempering. An $M_{23}C_6$ carbide is then formed in grain boundaries and martensite-lath boundaries. C is also combined with Nb or V so as to form an MX carbon nitride within martensite-lath. Accordingly, a high-temperature strength can be increased by precipitation hardening of both carbides. Further, C is an essential element not only for securing yield strength and tenacity but also for suppressing the production of δ-ferrite or BN. In order to obtain yield strength and tenacity for the disk material of the present invention, 0.08% or more of this element is necessary. But too much addition thereof may be harmful to the tenacity, and the $M_{23}C_6$ carbide may be excessively deposited. Consequently, a matrix strength may be reduced and a high-temperature strength after long-time use may be lost. Therefore, a content of carbon (C) should be limited to 0.08 to 0.25%. Preferably, its content should be 0.09 to 0.13%. More preferably, its content should be 0.10 to 0.12%.

Silicon (Si)

Si is an element effective as a deoxidizing agent for molten steels. However, too much addition of Si may result in the existence of $SiO_2$ produced by deoxidation in steels. $SiO_2$ is harmful to the clean level of steels and reduces tenacity. Also, Si helps the formation of Laves phase ($Fe_2M$) as an intermetallic compound, reduces creep rupture ductility by grain boundary segregation or the like and increases temper brittleness during high-temperature use. Therefore, a content of Si should be 0.5% or less. In recent years, a vacuum carbon deoxidizing method or an electroslag remelting method has been available. For this reason, Si deoxidation may not always be necessary. In such a case, a content of Si may be set to 0.1% or less and thus Si can be reduced in quantity.

Manganese (Mn)

Mn is effective as a deoxidizing agent or a desulfurizing agent for molten steels. Mn is an effective element for securing quenching so as to increase the strength. Mn is also an effective element for suppressing the production of $\delta$-ferrite or BN and helping deposition of an $M_{23}C_6$ carbide. However, if the quantity of Mn is increased, a creep rupture strength is reduced. Therefore, a content of Mn should be limited up to 1.0%. Preferably, its content should be 0.1 to 0.5%.

Nickel (Ni)

Ni is an element effective for securing steel quenching, suppressing the production of $\delta$-ferrite or BN and increasing the strength at room temperature and tenacity. Especially, for securing tenacity, at least 1.0% of Ni is necessary. These effects are substantially increased by a synergistic effect if the contents of both Ni and Cr are large. However, if the content of Ni exceeds 3.0%, high-temperature strength (creep strength and creep rupture strength) at 400 to 450° C. is reduced and temper brittleness is increased. Therefore, a content of Ni should be more than 1.0% and 3.0% or less. Preferably, its content should be 1.5 to 2.25%.

Chromium (Cr)

Cr is an essential constituting element of an $M_{23}C_6$ carbide which contributes toward oxidation/corrosion resistance and high-temperature strength by deposition distribution reinforcement. In order to obtain the foregoing effects, in the case of the steels of the present invention, Cr of at least 9.0% is necessary. However, if its content exceeds 12.5%, $\delta$-ferrite may be produced and high-temperature strength or tenacity may be reduced. Therefore, the content of Cr should be limited to 9.0 to 12.5%. Preferably, its content should be 10.2 to 11.5%. For manufacturing a large disk, the deposition of $\delta$-ferrite must be prevented during solution heat treatment. Preferably, for the steels of the present invention, the Cr equivalence (Cr+6Si+4Mo+1.5W+11V+5Nb−40C−2Mn−4Ni−2Co−30N) should be limited to 2.0% or less. In this way, $\delta$-ferrite can be prevented from being produced.

Molybdenum (Mo)

Mo is an important element to be added to ferritic steels as in the case of Cr. When added to steels, Mo increases quenching and temper softening resistance during tempering. Accordingly, strength at room temperature (tensile strength and yield strength) and high-temperature strength can be increased. Mo functions as a solidification reinforcing element, helps fine deposition of an $M_{23}C_6$ carbide and prevents aggregation. Mo also produces other carbides. As a deposition reinforcing element, Mo is quite effective for increasing creep strength, creep rupture strength, and high-temperature strength. Further, if 0.3% or more is added, temper brittleness of steels can be prevented. However, if excessively added, Mo produces $\delta$-ferrite and substantially reduces tenacity. Although Mo is one of elements for inducing new deposition of Laves phase ($Fe_2M$) as an intermetallic compound, in the case of the steels of the present invention, such tendency is suppressed because of its coexistence with Ni and Co. Therefore, the upper limit of adding Mo can be increased to 1.5% (not including 1.5%), and thus a Mo quantity should be 0.3% or more and lower than 1.5%.

Tungsten (W)

W is more effective than Mo for suppressing coarse aggregation of an $M_{23}C_6$ carbide. As a solidification reinforcing element, W is effective for increasing creep strength, creep rupture strength and high-temperature strength. Its effect is remarkable if used in combination with Mo. If added too much, W tends to produce $\delta$-ferrite or Laves phase ($Fe_2M$) as an intermetallic compound. Consequently, ductility or tenacity may be reduced. Creep rupture strength may also be reduced. The adding quantity of W is influenced by, in addition to the adding quantity of Mo, the adding quantities of Ni and Co. If Ni of 1.0 to 3.0% is added and Co of 1.0 to 5.0% is added, the addition of W exceeding 3% may result in solidification segregation, which is harmful to a large forged product. Therefore, a content of W should be 1.0 to 3.0%. As described above, since the effects of W are remarkable when added in combination with Mo, preferably, its combined adding quantity (Mo+0.5W) should be 1.40 to 2.45%. This combined addition (Mo+0.5W) is defined as the Mo equivalence.

Vanadium (V)

V is an element effective for increasing strength (tensile strength and yield strength) at room temperature as in the case of Mo. V is used as a solidification reinforcing element and a fine carbon nitride of V is deposited in a martensitic structure. Since such a fine carbon nitride controls recovery from dislocation during creeping so as to increase high-temperature strength including creep strength or creep rupture strength, V is important as a deposition reinforcing element. Further, if a certain quantity of V is added (0.03 to 0.35%), crystal grains are micronized and tenacity is increased. However, if added too much, V is harmful to tenacity, excessively solidifies carbons and reduces the deposition amount of the $M_{23}C_6$ carbide. Consequently, a high-temperature strength may be reduced. Therefore, a content of V should be 0.10 to 0.35%. Preferably, its content should be set to 0.15 to 0.25%.

Niobium (Nb)

Nb is, as in the case of V, an element effective for increasing strength at room temperature such as tensile strength or yield strength, and high-temperature strength such as creep strength or creep rupture strength. Also, Nb is very effective for producing fine NbC, micronizing crystal grains and improving tenacity. For quenching, a part of Nb functions to deposit an MX carbon nitride combined with the foregoing V carbon nitride during hardening and tempering and increase a high-temperature strength. Thus, Nb of at least 0.02% is necessary. However, if a content of Nb exceeds 0.10%, as in the case of V, carbon may be excessively solidified, the deposition amount of an $M_{23}C_6$ carbide may be reduced and a reduction may occur in high-temperature strength. Therefore, the content of Nb should be limited to 0.02 to 0.10%. Preferably, its content should be set to 0.02 to 0.05%. For manufacturing a large disk, lumpy NbC may be crystallized during steel ingot solidifying, and this lumpy NbC may adversely affect a mechanical property. Thus, preferably, a sum of Nb and 0.4 times C should be limited to Nb+0.4C≦0.12%. This sum (Nb+0.4C) is defined as the Nb equivalence. In this way, crystallization of lumpy NbC can be prevented.

Boron (B)

B is effective for increasing high-temperature strength by reinforcing grain boundaries and being solidified in an $M_{23}C_6$ carbide so as to prevent coarse aggregation of the same. B is effective if at least 0.001% is added. However, if its content exceeds 0.010%, welding or forging may be hampered. Therefore, the content of B should be limited to 0.001 to 0.01%. Preferably, its content should be 0.003 to 0.008%. During manufacturing a large disk, eutectic $Fe_2B$ or BN may be produced at the time of forging in a temperature of 900 to 1200° C., which adversely affects forging and a mechanical property. Thus, preferably, a sum of B and 0.5 times N should be limited to B+0.5N≦0.030%. This sum (B+0.5N) is defined as the B equivalence. In this way, the production of eutectic $Fe_2B$ or BN can be prevented.

Nitrogen (N)

N is effective for increasing high-temperature strength by depositing a V nitride and by an IS effect (mutual action between an intrusion type solidified element and a replacing type solidified element) obtained in cooperation with Mo and W in its solidified state. N of at least 0.01% is necessary. However, if its content exceeds 0.08%, ductility may be reduced. Therefore, the content of N should be limited to 0.01 to 0.08%. Preferably, its content should be 0.02 to 0.04%. Because of its coexistence with B, the production of eutectic $Fe_2B$ or BN may be promoted. Thus, preferably, the B equivalence should be limited to (B+0.5N)≦0.030% as discussed above.

Cobalt (Co)

Co is an important element for characterizing the present invention different from other inventions made in the related art. Co is effective for reinforcing solidification and suppressing deposition of δ-ferrite. Thus, Co may be used for manufacturing large forged products. According to the present invention, although an $A_{c1}$ transformation point declines to about 700° C. because of the addition of Ni, little change occurs in the $A_{c1}$ transformation point by the addition of Co (about 700° C. is secured). Accordingly, alloy elements can be added and high-temperature strength can be greatly increased. This little or small change is considered to be realized by an interaction between Mo and W, which is a characteristic phenomenon seen in the steels of the invention containing the Mo equivalence (Mo+0.5W) of 1.4% or more. For the steels of the invention, the lower limit of Co must be set to 1.0% so as to assure a Co effect when 1 to 3% of Ni is added. On the other hand, its upper limit should be set to 5%, because if Co is added too much, ductility may be reduced and costs may be increased. Therefore, the content of Co should be set to 1.0 to 5.0%. Preferably, its content should be set to 2.0 to 3.0%. For manufacturing a large disk, the deposition of δ-ferrite must be prevented at the time of solution heat treatment. Co is an element effective for reducing the Cr equivalence (Cr+6Si+4Mo+1.5W+11V+ 5Nb−40C−2Mn−4Ni−2Co−30N) as a parameter for predicting the deposition of δ-ferrite. For the steels of the invention, preferably, the Cr equivalence should be 2.0% or less. In this way, the production of δ-ferrite can be prevented.

Others

P, S and Cu are impurity elements, and intrusion thereof from raw materials for steel making cannot be prevented. Preferably, the content of each of these elements must be reduced as much as possible. However, if selection of raw materials is made strict, costs will increase. Thus, P should be set to 0.03% or less, preferably 0.015% or less, S should be 0.01% or less, preferably 0.005% or less, and Cu should be 0.50% or less. Other impurity elements include Al, Sn, Sb and As.

Next, the solution/quenching heat treatment temperature will be described. In order to increase high-temperature strength by depositing an MX carbon nitride, the heat resisting steels of the present invention contain Nb of 0.02 to 0.10%. For realizing such an effect, Nb must be completely dissolved in austenite during the solution heat treatment. However, if the quenching temperature is set lower than 1050° C., a coarse carbon nitride deposited at the time of solidification remains even after the heat treatment. Consequently, Nb cannot be so effective for increasing creep rupture strength. In order to temporarily dissolve this coarse carbon nitride and deposit the same highly densely as a micro carbon nitride, quenching must be performed from an austenizing temperature of 1050° C. or higher at which an austenitizing process progresses more. In the case of the heat resisting steels of the invention, if the temperature exceeds 1150° C., a temperature region for depositing δ-ferrite is reached and the crystal grain diameter becomes very large. Consequently, ductility may be reduced. Therefore, preferably, the quenching temperature range should be set to 1050 to 1150° C.

Next, the tempering heat treatment temperature will be described. One of the characteristics of the heat resisting steels of the present invention is that first stage tempering heat treatment is performed at a temperature of 500 to 570° C. so as to completely eliminate austenite remaining after quenching. Another characteristic is that the second stage tempering heat treatment is performed at a temperature of 530 to 680° C. so as to deposit an $M_{23}C_6$ carbide and an intermetallic compound mainly in crystal grain boundaries and martensite-lath and an MX carbon nitride within martensite-lath. If the first sage tempering heat treatment temperature is lower than 500° C., non-transformed austenite cannot be completely converted into martensite. If the temperature exceeds 570° C., the second tempering heat treatment cannot be so effective. Therefore, the first stage tempering heat treatment should be performed within a temperature range of 500 to 570° C. If the second stage tempering heat treatment temperature is lower than 530° C., the depositions of the $M_{23}C_6$ carbide and the MX carbon nitride cannot reach balanced values. Consequently, the volumes of the deposited elements may be reduced relative to each other. Further, if the deposited elements in such unstable states then receive creeping for a long time at high temperatures exceeding 450° C., deposition may progress and coarse aggregation may become conspicuous. On the other hand, if the second stage tempering heat treatment temperature exceeds 680° C., the deposition density of the MX carbon nitride in the martensitic structure may be reduced and tempering may become excessive. Consequently, the specified strength cannot be obtained. Also, the temperature may be brought close to the austenite transformation point $A_{c1}$ (about 700° C.). Therefore, preferably, the second stage tempering heat treatment temperature should be set within a range of 530 to 680° C.

By performing the foregoing heat treatment, the amount of the $M_{23}C_6$ carbide deposited in the crystal grain boundaries or in the martensitic boundaries is set within a range of 1.5 to 2.5 wt. %, the deposition amount of the MX carbon nitride deposited inside the martensitic structure is set within a range of 0.1 to 0.5 wt. % and the deposition amount of the intermetallic compound deposited in the crystal grain boundary and martensite-lath boundary is set within a range of 0 to 1.5 wt. %. The total amount of the foregoing deposited elements is adjusted to be within a range of 1.5 to 4.0 wt. %. In this way, a high-temperature rupture strength and creep resistance can be increased and property reduction after the passage of long periods of time at high temperatures can be limited to a small level. Most preferably, the total amount of deposited elements should be set within a range of 2.5 to 3.0 wt. %. Specifically, it is preferred that the deposition amount of the $M_{23}C_6$ carbide should be adjusted to 1.6 to 2.0 wt. % and the deposition amount of the MX carbon nitride should be adjusted to 0.1 to 0.2 wt. %. For measuring the total amount of deposited elements, an electrolytic extraction residual method is employed. By this method, a sample is dipped in a mixed liquid containing acetylacetone of 10%, tetramethyl ammonium chloride of 1% and methanol, and then the mother phase is dissolved by electrolysis.

Next, the crystal grain diameter of the heat resisting steels of the present invention will be described. For the conventional high Cr heat resisting steels, the crystal grain diameter has been prevented from becoming coarse so as to secure tenacity and creep rupture ductility or increasing fatigue strength. If the crystal grain diameter is lower than 20 $\mu$m, the value of creep rupture strength is small. On the other hand, if the crystal grain diameter exceeds 150 $\mu$m, tenacity and creep rupture ductility are greatly reduced and cracks may easily occur in grain boundaries during quenching. Therefore, preferably, the crystal grain diameter should be set within a range of 20 to 150 $\mu$m.

Next, a method of manufacturing the heat resisting steels of the present invention will be described. The heat resisting steel ingots of the invention are manufactured by using an electroslag remelting method or a steel ingot manufacturing method based on it. For large parts of a gas turbine, such as a rotor or a disk, segregation easily occurs in added elements during molten metal solidification or nonuniformity easily occurs in a solidified structure. The heat resisting steels of the invention are characterized by the addition of Co and a small quantity of B. B is an element easily segregated in steel ingots compared with Co and others. In the case of the heat resisting steels of the invention, for large steel ingots, a steel ingot manufacturing method for suppressing the segregation of B as much as possible must be provided. Therefore, preferably, an electroslag remelting method or a steel ingot manufacturing method based on the same, for example an electroslag feeder head heat insulating method, should be employed for reducing segregation of elements such as B and improving soundness/uniformity of large steel ingots.

The next section describes the present invention in detail with reference to the embodiments.

EMBODIMENT 1

(1) Material Property for Creep and Tenacity (1)

Tables 5 and 6 show chemical composition of heat resisting steels of 12 kinds used as specimens.

TABLE 5

CHEMICAL COMPOSITION OF HEAT RESISTING STEELS OF THE EMBODIMENT 1 OF THE INVENTION (NUMERALS INDICATE WT/%)

| SAMPLE No. | C | Si | Mn | P | S | Ni | Cr | Mo | W | V | Nb | N | B | Co | Fe |
|---|---|---|---|---|---|---|---|---|---|---|---|---|---|---|---|
| STEELS OF THE INVENTION | | | | | | | | | | | | | | | |
| 1 | 0.12 | 0.05 | 0.08 | 0.008 | 0.001 | 1.20 | 10.5 | 0.71 | 1.82 | 0.20 | 0.055 | 0.025 | 0.004 | 3.3 | RESIDUE |
| 2 | 0.12 | 0.05 | 0.08 | 0.008 | 0.001 | 2.10 | 10.5 | 0.72 | 1.81 | 0.20 | 0.055 | 0.025 | 0.004 | 3.3 | RESIDUE |
| 3 | 0.12 | 0.05 | 0.08 | 0.008 | 0.001 | 2.80 | 10.5 | 0.71 | 1.82 | 0.20 | 0.056 | 0.026 | 0.004 | 2.8 | RESIDUE |
| 4 | 0.12 | 0.05 | 0.08 | 0.008 | 0.001 | 2.80 | 10.5 | 0.68 | 1.80 | 0.20 | 0.055 | 0.027 | 0.002 | 2.8 | RESIDUE |
| 5 | 0.12 | 0.05 | 0.08 | 0.008 | 0.001 | 2.40 | 10.5 | 0.69 | 1.79 | 0.20 | 0.055 | 0.025 | 0.004 | 2.5 | RESIDUE |
| 6 | 0.12 | 0.05 | 0.40 | 0.008 | 0.001 | 1.80 | 10.5 | 0.69 | 1.81 | 0.20 | 0.055 | 0.025 | 0.004 | 2.4 | RESIDUE |
| 7 | 0.12 | 0.05 | 0.20 | 0.008 | 0.001 | 2.20 | 10.5 | 0.69 | 1.78 | 0.20 | 0.055 | 0.025 | 0.003 | 2.7 | RESIDUE |
| 8 | 0.12 | 0.05 | 0.08 | 0.008 | 0.001 | 2.80 | 10.5 | 0.72 | 1.80 | 0.20 | 0.055 | 0.025 | 0.004 | 2.7 | RESIDUE |
| COMPARED STEELS | | | | | | | | | | | | | | | |
| 9 | 0.12 | 0.05 | 0.08 | 0.008 | 0.001 | 2.90 | 10.3 | 0.69 | 1.81 | 0.20 | 0.054 | 0.025 | 0 | 0 | RESIDUE |
| 10 | 0.12 | 0.05 | 0.08 | 0.008 | 0.001 | 2.40 | 10.5 | 0.71 | 1.77 | 0.20 | 0.057 | 0.024 | 0 | 0 | RESIDUE |
| 11 | 0.14 | 0.07 | 0.08 | 0.005 | 0.003 | 0.52 | 10.1 | 0.65 | 1.71 | 0.21 | 0.051 | 0.025 | 0.006 | 3.72 | RESIDUE |
| 12 | 0.14 | 0.07 | 0.50 | 0.008 | 0.002 | 0.60 | 10.3 | 1.46 | 0 | 0.17 | 0.056 | 0.056 | 0 | 0 | RESIDUE |

TABLE 6

CHEMICAL COMPOSITION OF HEAT RESISTING STEELS OF THE FIRST EMBODIMENT OF THE INVENTION (NUMERALS INDICATE WT. %)

| SAMPLE No. | | Mo EQUIVALENCE EXPRESSION (1) | Cr EQUIVALENCE EXPRESSION (2) | B EQUIVALENCE EXPRESSION (3) | Nb EQUIVALENCE EXPRESSION (4) |
|---|---|---|---|---|---|
| STEELS OF | 1 | 1.62 | 1.735 | 0.0165 | 0.103 |
| THE | 2 | 1.625 | −1.840 | 0.0165 | 0.103 |
| INVENTION | 3 | 1.62 | −3.690 | 0.017 | 0.104 |
| | 4 | 1.58 | −3.875 | 0.0155 | 0.103 |
| | 5 | 1.585 | −1.590 | 0.0165 | 0.103 |
| | 6 | 1.595 | 0.40 | 0.0165 | 0.103 |
| | 7 | 1.58 | −1.445 | 0.0155 | 0.103 |
| | 8 | 1.62 | 1.945 | 0.0165 | 0.103 |
| COMPARED | 9 | 1.595 | 1.235 | 0.0125 | 0.102 |
| STEELS | 10 | 1.595 | 3.50 | 0.012 | 0.105 |
| | 11 | 1.505 | 2.22 | 0.0185 | 0.107 |
| | 12 | 1.46 | 8.03 | 0.028 | 0.112 |

(NOTE)
EXPRESSION (1) Mo EQUIVALENCE = Mo + 0.5 w (1.40 TO 2.45% IS CLAIMED IN THE INVENTION)
EXPRESSION (2) Cr EQUIVALENCE = Cr + 6Si + 4Mo + 1.5W + 11V + 5Nb—40C—2Mn—4Ni—2Co—30N (2.0% OR LESS IS CLAIMED IN THE INVENTION)
EXPRESSION (3) B EQUIVALENCE = B + 0.5N (0.03% OR LESS IS CLAIMED IN THE INVENTION)
EXPRESSION (4) Nb EQUIVALENCE = Nb + 0.4C (0.12% OR LESS IS CLAIMED IN THE INVENTION)
AS SOURCES FOR EXPRESSIONS (1) AND (2), FOR EXAMPLE, FOLLOWING MATERIALS ARE AVAILABLE.
EXPRESSIONS (3) AND (4) ARE PARAMETERS PROPOSED BY THE INVENTION.
EXPRESSION (1) T. Fujita, T. Sato and N. Takahashi: Transactions ISIJ, vol. 18, 1978, P. 155.
EXPRESSION (2) D. L. Newhouse, C. J. Boyle and R. M. Curran: Preprint of ASTM Annual Meeting, Purdue University, June 13–18, 1965.

In Tables 5 and 6, Nos. 1 to 8 indicate steels within the chemical composition range of the heat resisting steels of the present invention. Nos. 9 to 12 indicate comparable steels not within the chemical composition range of the heat resisting steels of the invention. Among the latter steels, Nos. 9 and 10 indicate steels in which the adding quantities of Co and B are not within the range of addition specified by the invention. No. 11 indicates steels disclosed, for example in Japanese Patent Provisional Publication No. 7-86629 (1995). These steels were invented as high-strength heat resisting steels to be used as rotor materials for a steam turbine. In this case, the adding quantity of Ni is not within the range specified by the present invention. Further, No. 12 indicates steels disclosed in Japanese Patent Provisional Publication No. 60-165360 (1985), which have been used as rotor materials for a high and medium steam turbine. In these steels, the adding quantities of Ni, Co and B are not within the range specified by the present invention. We dissolved these steels in a laboratory size vacuum dissolving furnace and made steel ingots of 50 kg. We then subjected these steel ingots to uniform heating and forging (forging of 1/2.8U casting and 3.7S stretching) assuming that these steel ingots were used as actual disk materials, and made small forged products. Thereafter, we subjected these forged products to preliminary heat treatment (e.g., 1050° C. air cooling or 650° C. air cooling so as to adjust grain sizes. For these formed products, we performed heat treatment by simulating the quenching/cooling speed of the center part of a large disk having a diameter of 1800 mm and a thickness of 250 mm. In other words, we heated the forged products at temperature of 1050° C. for 15 hours, then performed quenching by setting the quenching/cooling speed of the disk center part to about 250° C./hr and then performed the first stage tempering at temperature of 550° C. for 5 hours and the second stage tempering at temperature of 640° C. for 10 hours. According to the condition for tempering, we adjusted the strength necessary for designing a compressor disk material, in other words, the 0.2% yield strength at room temperature, to 80 kg/mm$^2$ or higher.

We performed tensile and impact tests at room temperature (20° C.) for the steels Nos. 1 to 8 of the present invention and the compared steels Nos. 9 to 12. We obtained impact values and 50% FATT (fracture appearance transition temperature) based on the results of Charpy impact tests. These values are shown together with tensile characteristics in Table 7. We performed creep rupture tests for the steels Nos. 1 to 8 of the invention and the compared steels Nos. 9 to 12 in temperatures of 450° C. and 500° C. Then, based on the result of the tests, we estimated creep rupture strengths in the temperatures of 450° C. and 500° C. for 10$^5$ hours by extrapolation. These results are also shown in Table 7.

TABLE 7

ROOM TEMPERATURE TENSILE CHARACTERISTICS, IMPACT VALUES, 50% FATT
AND CREEP RUPTURE STRENGTHS OF HEAT RESISTING STEELS OF THE FIRST EMBODIMENT

| PROPERTY<br>SAMPLE No. | TENSILE STRENGTH (kgf/mm$^2$) | 0.2 YIELD STRENGTH (kgf/mm$^2$) | ELONGATION (%) | DRAWING (%) | IMPACT VALUE (kgf-m/cm$^2$) | 50% FATT (°C.) | 10$^5$ HR CREEP RUPTURE STRENGTH (kgf/mm$^2$) 450° C. | 500° C. |
|---|---|---|---|---|---|---|---|---|
| STEELS OF THE INVENTION | | | | | | | | |
| 1 | 99.0 | 86.0 | 21 | 64 | 17.7 | 12 | 50.0 | 35.0 |
| 2 | 102.0 | 87.0 | 20 | 65 | 19.2 | −20 | 48.0 | 33.0 |
| 3 | 104.0 | 81.0 | 19 | 62 | 20.2 | −65 | 42.5 | 30.0 |
| 4 | 105.0 | 84.0 | 21 | 66 | 20.0 | −65 | 42.0 | 31.0 |
| 5 | 101.0 | 85.2 | 22 | 63 | 15.5 | −35 | 44.0 | 32.0 |
| 6 | 98.0 | 85.0 | 21 | 63 | 18.0 | −10 | 46.0 | 33.0 |
| 7 | 102.0 | 87.0 | 21 | 64 | 20.0 | −25 | 42.0 | 30.0 |
| 8 | 100.0 | 83.0 | 22 | 74 | 21.0 | −65 | 40.0 | 31.0 |
| COMPARED STEELS | | | | | | | | |
| 9 | 101.0 | 85.0 | 19 | 63 | 19.6 | −72 | 36.0 | 27.0 |
| 10 | 101.0 | 88.0 | 23 | 66 | 16.2 | −35 | 37.0 | 28.0 |
| 11 | 97.0 | 82.0 | 17 | 53 | 2.8 | 80 | 48.0 | 35.0 |
| 12 | 100.0 | 86.0 | 17 | 54 | 6.3 | 44 | 46.0 | 34.0 |

As apparent from Table 7, for any of the steels of the present invention, the 0.2% yield strength is high, exceeding 80 kg/mm$^2$, which is sufficient as a compressor disk material. For elongation and drawing, any of the steels of the invention has satisfactory levels, exceeding 16% for elongation and 45% for drawing which are generally required of the disk materials. For impact properties, the target value of 50% FATT of the compressor disk material is +20° C. or lower. In any of the steels Nos. 1 to 8 of the invention and the compared steels Nos. 9 and 10, the values are lower than the target. It can thus be understood that these steels have sufficient tenacity. On the other hand, in the cases of the steels Nos. 11 and 12, 50% FATT values are high, 80° C. and 44° C. respectively, which far exceeds the target value. It can be understood that these steels Nos. 11 and 12 do not have satisfactory tenacity as compressor disk materials.

It is also apparent from Table 7 that 450° C.×10$^5$ hr creep rupture strengths of the steels Nos. 1 to 8 of the present invention exceed those of the compared steels Nos. 9 and 10, these creep rupture strengths also exceed a creep rupture strength (40 kgf/mm$^2$) required of a compressor disk material showing improvements and thus creep rupture lives of the steels of the invention are very long. Although the compared steels Nos. 11 and 12 do not provide values within the target for tenacity as described above, creep rupture strengths thereof can be considered to be equal to those of the steels Nos. 1 and 2 of the invention.

EMBODIMENT 2

(2) Material Property for Creep and Tenacity (2)

We made small forged products by dissolving and forging as in the first embodiment and then performed different tempering heat treatments for these small forged products. Specifically, first we performed heat treatment for the small forged products by simulating the quenching/cooling speed of the center part of a large disk having a diameter of 1600 mm and a thickness of 400 mm. In other words, we heated the small forged products at temperature of 1050° C. for 15 hours so as to form complete austenite and then quenched these products by setting the quenching/cooling speed of the disk center part to about 200° C./hr. Then, we performed 5-hour first stage tempering at temperature of 550° C. and 10-hour second stage tempering at temperature of 580° C. According to the condition for tempering, we adjusted the strength necessary for designing a high-temperature turbine disk material, in other words, the 0.2% yield strength at room temperature, to 95 kg/mm$^2$ or higher.

We performed tensile and impact tests at room temperature (20° C.) for the steels Nos. 1 to 8 of the present invention and the compared steels Nos. 9 to 12. Based on the results of Charpy impact tests, we obtained impact values and 50% FATT, which are shown together with tensile characteristics in Table 8. We also performed creep rupture tests for the steels Nos. 1 to 8 of the invention and the compared steels Nos. 9 to 12 at temperatures of 450° C. and 500° C. and, based on the results of these tests, we estimated 10$^5$-hour creep rupture strengths at temperatures of 450° C. and 500° C. by extrapolation. The estimated results are also shown in Table 8.

TABLE 8

ROOM TEMPERATURE TENSILE CHARACTERISTICS, IMPACT VALUES, 50% FATT
AND CREEP RUPTURE STRENGTHS OF HEAT RESISTING STEELS OF THE SECOND EMBODIMENT

| PROPERTY<br>SAMPLE No. | TENSILE<br>STRENGTH<br>(kgf/mm$^2$) | 0.2% YIELD<br>STRENGTH<br>(kgf/mm$^2$) | ELONGATION<br>(%) | DRAWING<br>(%) | IMPACT<br>VALUE<br>(kgf-m/cm$^2$) | 50% FATT<br>(°C.) | $10^5$ HR CREEP RUPTURE STRENGTH (kgf/mm$^2$) | |
|---|---|---|---|---|---|---|---|---|
| | | | | | | | 450° C. | 500° C. |
| STEELS OF THE INVENTION | | | | | | | | |
| 1 | 117.0 | 100.0 | 21 | 73 | 10.0 | 15 | 61.0 | 45.0 |
| 2 | 117.0 | 100.0 | 20 | 74 | 27.0 | −10 | 58.0 | 43.0 |
| 3 | 117.0 | 97.0 | 22 | 73 | 24.8 | −60 | 54.0 | 41.0 |
| 4 | 113.0 | 94.0 | 21 | 64 | 20.6 | −60 | 55.0 | 40.0 |
| 5 | 115.0 | 100.0 | 22 | 70 | 20.2 | −30 | 57.0 | 42.0 |
| 6 | 117.0 | 100.0 | 21 | 73 | 22.0 | 5 | 56.5 | 41.0 |
| 7 | 117.0 | 100.0 | 21 | 73 | 23.2 | −15 | 52.0 | 40.5 |
| 8 | 112.0 | 96.0 | 23 | 73 | 27.0 | −60 | 51.5 | 42.0 |
| COMPARED STEELS | | | | | | | | |
| 9 | 108.0 | 94.0 | 21 | 68 | 22.1 | −65 | 47.0 | 36.0 |
| 10 | 111.0 | 98.0 | 22 | 70 | 20.0 | −25 | 46.0 | 37.0 |
| 11 | 115.0 | 97.0 | 17 | 53 | 2.3 | 110 | 60.0 | 44.0 |
| 12 | 115.0 | 99.0 | 18 | 67 | 4.0 | 48 | 58.0 | 43.0 |

As apparent from Table 8, for any of the steels of the invention, the 0.2% yield strength is high, exceeding 95 kg/m$^2$, which is sufficient as a high-temperature turbine disk material. For elongation and drawing, these steels exceed the levels, respectively 16% for elongation and 45% for drawing, which are required of a general disk material. For impact properties, a target value of 50% FATT for a high-temperature disk material is +20° C. In the cases of the steels Nos. 1 to 8 of the invention and the compared steels Nos. 9 and 10, the values are lower than the target values. It can thus be understood that these steels have sufficient tenacity. On the other hand, in the cases of the compared steels Nos. 11 and 12, 50% FATT values are high, 110° C. and 48° C. respectively, far exceeding the target value. Thus, these steels do not have sufficient tenacity to be used as high-temperature turbine disk materials.

It is also apparent from Table 8 that 450° C.×10$^5$ hr creep rupture strengths of the steels Nos. 1 to 8 of the present invention exceed those of the compared steels Nos. 9 and 10, these creep rupture strengths also exceed the creep rupture strength (50 kgf/mm$^2$) required of a high-temperature disk material showing improvements and thus the creep rupture lives of the steels of the invention are very long. Although the compared steels Nos. 11 and 12 do not provide values within the target value for tenacity as described above, creep rupture strengths thereof can be considered to be equal to those of the steels Nos. 1 and 2 of the present invention.

EMBODIMENT 3

Figure 1:
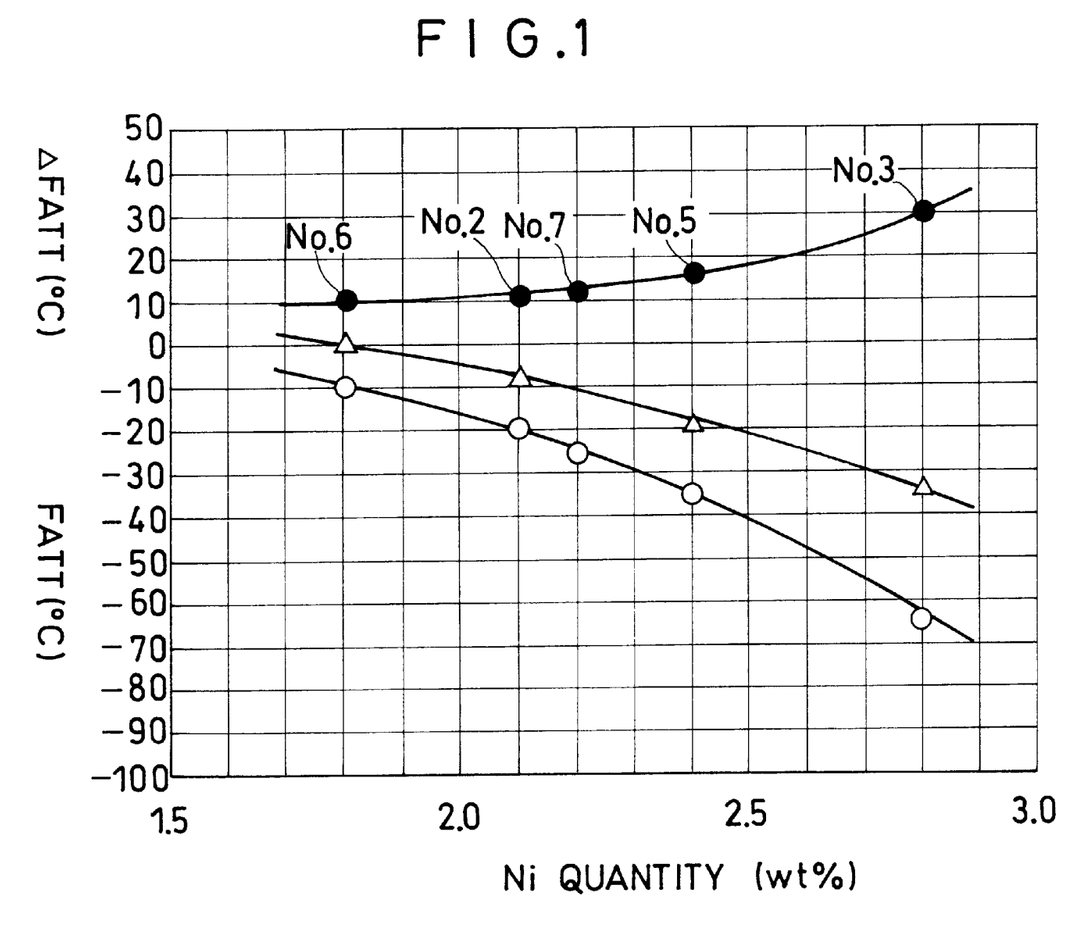
FIG. 1 is a graph showing relations between Ni quantity and FATT and between Ni quantity and Δ FATT in Co added steels of a third embodiment of the present invention.

(3) Influence Given to Ni Brittle Sensitivity in Co Added Steels of the Invention In the description of the third embodiment, attention will be paid to Co added steels of the present invention. Co is an important element, the addition of which characterizes the invention to be different from the inventions made in the related art. Specifically, this section describes influence given to Ni brittle sensitivity under the addition of Co, especially brittle sensitivity when the steels are used in a temperature of about 400° C. or higher for a long time. For experimentation, we used the small forged products made by dissolving and forging as in the first embodiment. We performed equal temperature aging tests for the tempered and re-tempered materials at a temperature of 500° C. for 1000 hours. After the aging tests, we performed Charpy impact tests within a temperature range, including a room temperature, of −100° C. to 0° C. so as to obtain impact values and percent brittle fractures for each temperature. Then, we obtained 50% FATT (fracture appearance transition temperature) for each sample. As a value of 50% FATT is smaller, tenacity is higher. Herein, a difference between a value of 50% FATT of each tempered product (FATTo) and a value of 50% FATT after the aging (FATTt) is represented by Δ FATT to be used as an index for brittle sensitivity. As a value of this Δ FATT is lower, brittle sensitivity is lower, in other words, it is more difficult for brittleness to occur. FIG. 1 is a graph showing relations between Ni quantities and FATT and between Ni quantities and Δ FATT in the Co added steels of the present invention. In the drawing, 0 indicates a value of 50% FATT when a material is used in its tempered state (FATTo), A indicates a value of 50% FATT when a tempered material subjected to 1000-hour equal temperature aging at a temperature of 500° C. is used (FATTt) and ●indicates a difference between FATTt and FATTo, that is, a value of FATTt−FATTo(=Δ FATT).

As shown in FIG. 1, Δ FATT is kept at a nearly constant low value until a quantity of Ni reaches about 2.25%. Δ FATT is increased by more addition of Ni and thus brittle sensitivity is also increased. According to the present invention, a content of Ni should be more than 1.0% and 3.0% or less. Preferably, however, the upper limit of a content of Ni should be 2.25% so as to suppress brittle sensitivity.

EMBODIMENT 4

(4) Variety and Deposition Amount of Metallic Structure and Deposited Elements

Figure 2:
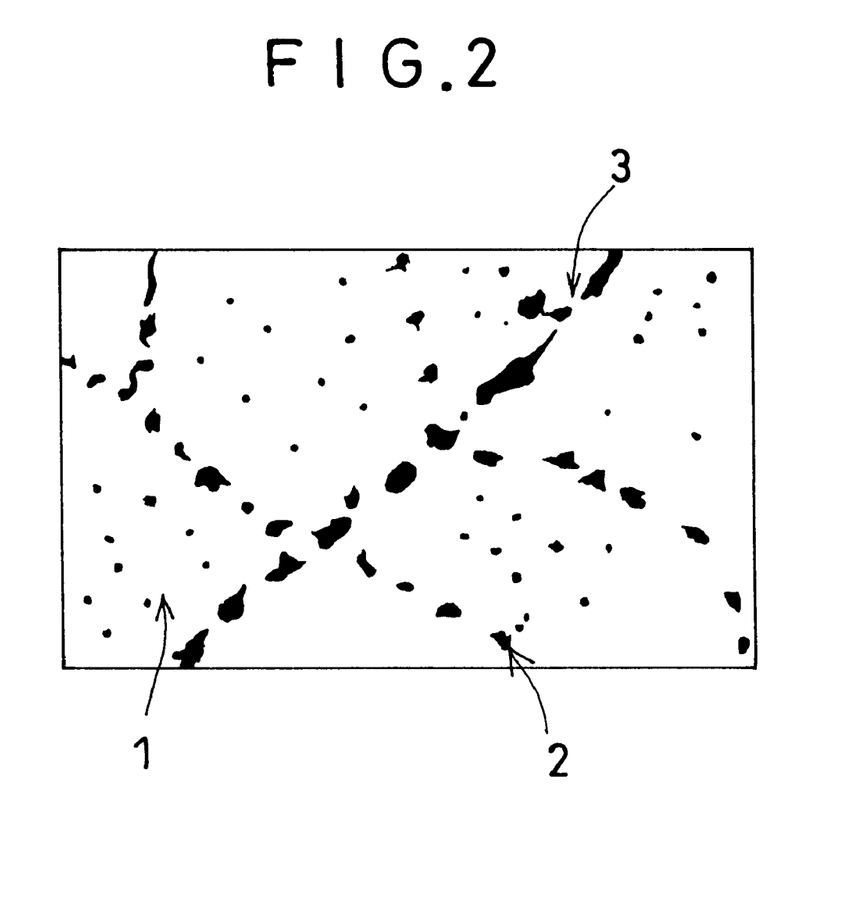
FIG. 2 is a typical diagramic view showing metal structure of steels of a fourth embodiment of the present invention.

In the embodiment 4, a metallic structure, especially variety of deposited elements and deposition amounts, will be described. FIG. 2 typically illustrates a representative 100% tempered martensite structure, which is obtained as a result of observing a metallic structure using an extracted replica of samples of the steels of the first embodiment of the present invention. As shown in FIG. 2, a 100% martensite structure is composed of an internal part of martensite-lath 1, a boundary of martensite-lath 2 and a grain boundary (old austenite boundary) 3. Table 9 shows variety of deposited elements based on a division between tempered samples after heat treatment and samples after creep ruptures corresponding to the composition of the martensite structure.

TABLE 9

| DIVISION | INTERNAL PART OF MARTENSITE-LATH 1 | BOUNDARY OF MARTENSITE-LATH 2 | GRAIN BOUNDARY 3 (OLD AUSTENITE BOUNDARY) |
|---|---|---|---|
| FORM OF DEPOSITED ELEMENT | MICRO DEPOSITED ELEMENT | LUMPY GRANULAR DEPOSITED ELEMENT | LUMPY GRANULAR DEPOSITED ELEMENT |
| TEMPERED MATERIAL AFTER HEAT TREATMENT | MX CARBON NITRIDE | $M_{23}C_6$ CARBIDE, INTERMETALLIC COMPOUND (LAVES PHASE) | $M_{23}C_6$ CARBIDE, INTERMETALLIC COMPOUND (LAVES PHASE) |
| AFTER CREEP RUPTURE | MX CARBON NITRIDE | $M_{23}C_6$ CARBIDE, INTERMETALLIC COMPOUND (LAVES PHASE) | $M_{23}C_6$ CARBIDE, INTERMETALLIC COMPOUND (LAVES PHASE) |

As shown in Table 9, there is no special difference in variety of deposited elements between a tempered sample and a sampler after creep rupture. In the grain boundary 3, a lumpy $M_{23}C_6$ carbide and a granular intermetallic compound (Laves phase) are deposited. The $M_{23}C_6$ carbide as an M element for composition is a compound containing Fe, Cr, Mo and W. The intermetallic compound (Laves phase) as an $Fe_2M$ type M element for composition contains elements of Cr, Mo and W. In the boundary of martensite-lath 2, the foregoing $M23C_6$ carbide and the intermetallic compound (Laves phase) are also deposited. Further, in the internal part of martensite-lath 1, a micro MX carbon nitride is deposited. The MX carbon nitride as an M element for composition contains Nb, V, C and N, which are combined to form a micro carbon nitride. Each of the metallic structures of the samples shown in the first, second and third embodiments is a 100% tempered martensite structure.

As a representative sample of the steels of the present invention, which was subjected to the heat treatment of the first embodiment (second stage tempering temperature: 640° C.), the total quantity of the deposited elements of the sample No. 3 is 2.81 wt. %. Specifically, this sample No. 3 contains an $M_{23}C_6$ carbide of 2.52 wt. %, an MX carbon nitride of 0.12 wt. % and Laves phase of 0.17 wt. %. The total quantity of the deposited elements of the same sample No. 3 subjected to the heat treatment of the second embodiment (second stage tempering temperature: 580° C.) is 1.97 wt. %. Specifically, this sample No. 3 contains a $M_{23}C_6$ carbide of 1.68 wt. %, a MX carbon nitride of 0.11 wt. % and Laves phase of 0.18 wt. %. It can thus be understood that if tempering temperatures are different, a great change occurs in the deposition amount of the $M_{23}C_6$ carbide while little change occurs in the deposition amounts of the MX carbon nitride and Laves phase. In the case of the steels of the present invention, by adjusting the total quantity of these deposited elements to 1.5 to 4.0 wt. %, optimal tenacity and the high-temperature strength can be secured.

What is claimed is:

1. A highly tenacious martensitic heat resisting steel comprising by weight: 0.08 to 0.25% carbon, 0.5% silicon or less, 1.0% manganese or less, above 2.0% and not exceeding 3.0% nickel, 9.0 to 12.5% chromium, 0.3% to 1.5% molybdenum, 1.0 to 3.0% tungsten, 0.10 to 0.35% vanadium, 0.02 to 0.10% niobium, 0.01 to 0.08% nitrogen, 0.001 to 0.01% boron, and 1.0 to 5.0% cobalt, the remainder containing substantially iron; said steel being composed of a tempered martensite matrix.

2. A highly tenacious martensitic heat resisting steel according to claim 1, wherein a Cr equivalence defined as Cr+6Si+4Mo+1.5W+11V+5Nb−40C−2Mn−4Ni−2Co−30N is 2.0% or less, a B equivalence represented by B+0.5N is 0.030% or less, an Nb equivalence represented by Nb+0.4C is 0.12% or less, an Mo equivalence represented by Mo+0.5W is 1.40 to 2.45% and, among inevitable impurity elements, sulfur is limited to 0.01% or less, phosphorous is limited to 0.03% or less and Cu is limited to 0.5% or less.

3. A highly tenacious martensitic heat resisting steel according to claim 1, formed from a quenching heat treatment temperature of 1050 to 1150° C., a first stage tempering heat treatment temperature of at least 500 to 570° C. and, a second stage tempering heat treatment temperature of 530 to 680° C.

4. A highly tenacious martensitic heat resisting steel according to claim 1, further comprising an $M_{23}C_6$ carbide and an intermetallic compound mainly deposited in grain boundaries and martensite-lath boundaries and an MX carbon nitride deposited within martensite-lath, wherein the total quantity of said $M_{23}C_6$ carbide, said intermetallic compound, and said MX carbon nitride is 1.5 to 4.0 wt. %.

5. A highly tenacious martensitic heat resisting steel according to claim 4, said steel having an austenite crystal grain diameter of from 20 to 150 μm.

6. A steel ingot comprising the highly tenacious martensitic heat resisting steel according to claim 5 and obtained by using at least one of an electroslag remelting method and a steel ingot making method base on said electroslag remelting method.

7. A highly tenacious martensitic heat resisting steel according to claim 2, formed from a quenching heat treatment temperature of 1050 to 1150° C. a first stage tempering heat treatment temperature of at least 500 to 570° C. and, a second stage tempering heat treatment temperature of 530 to 680° C.

8. A highly tenacious martensitic heat resisting steel according to claim 7, further comprising an $M_{23}C_6$ carbide and an intermetallic compound mainly deposited in grain boundaries and martensite-lath boundaries and an MX carbon nitride deposited within martensite-lath, wherein the total quantity of said $M_{23}C_6$ carbide, said intermetallic compound, and said MX carbon nitride is 1.5 to 4.0 wt. %.

9. A highly tenacious martensitic heat resisting steel according to claim 8, said steel having an austenite crystal grain diameter of from 20 to 150 μm.

10. A steel ingot comprising the highly tenacious martensitic heat resisting steel according to claim 9 and obtained by using at least one of an electroslag remelting method and a steel ingot making method based on said electroslag remelting method.

11. A highly tenacious martensitic heat resisting steel according to claim 1, wherein said steel comprises at least about 2.1% of nickel.

12. A highly tenacious martensitic heat resisting steel according to claim 1, wherein said steel comprises at least about 2.2% of nickel.

* * * * *

UNITED STATES PATENT AND TRADEMARK OFFICE
CERTIFICATE OF CORRECTION

PATENT NO. : 5,944,922
DATED : August 31, 1999
INVENTOR(S) : Kadoya et al.

It is certified that error appears in the above-identified patent and that said Letters Patent is hereby corrected as shown below:

Column 2, Table 1, first column, line 4, "Class 1-9" should read --Class 1-9--.

Columns 19 - 20, Table 8, sample no. 6, column 6, "5" should read -- -5--.

Column 22, line 57, "base" should read --based--.

Signed and Sealed this

Seventh Day of March, 2000

Attest:

Attesting Officer

Q. TODD DICKINSON

Commissioner of Patents and Trademarks